(12) United States Patent
Kaechi et al.

(10) Patent No.: US 10,785,726 B2
(45) Date of Patent: Sep. 22, 2020

(54) WIRELESS COMMUNICATION APPARATUS WIRELESSLY COMMUNICATING WITH ANOTHER WIRELESS COMMUNICATION APPARATUS, CONTROL METHOD OF WIRELESS COMMUNICATION APPARATUS, AND STORAGE

(71) Applicant: CANON KABUSHIKI KAISHA, Tokyo (JP)

(72) Inventors: Shuya Kaechi, Hashimoto (JP); Daisuke Kamiwano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 15/483,872

(22) Filed: Apr. 10, 2017

(65) Prior Publication Data

US 2017/0311267 A1  Oct. 26, 2017

(30) Foreign Application Priority Data

Apr. 22, 2016 (JP) .................................. 2016-086427

(51) Int. Cl.
*H04W 52/02* (2009.01)
*H04L 12/26* (2006.01)
(Continued)

(52) U.S. Cl.
CPC ......... *H04W 52/0296* (2013.01); *H04L 43/16* (2013.01); *H04M 1/73* (2013.01);
(Continued)

(58) Field of Classification Search
CPC ........... H04W 52/0277; H04W 52/028; H04W 52/0225; H04W 88/06; H04W 52/0258; H04M 1/73
See application file for complete search history.

(56) References Cited

U.S. PATENT DOCUMENTS

2009/0093279 A1* 4/2009 Matsuura ............. H04B 5/0056
455/574
2010/0174501 A1* 7/2010 Myadam ................. H04W 8/24
702/63

(Continued)

FOREIGN PATENT DOCUMENTS

JP  2010-051080 A  3/2010
JP  2010-218189 A  9/2010

*Primary Examiner* — Hoon J Chung
(74) *Attorney, Agent, or Firm* — Canon U.S.A, Inc., IP Division

(57) ABSTRACT

A wireless communication apparatus includes a first control unit operating with power supplied from a secondary battery and operable in a case where a detected voltage of the secondary battery is greater than or equal to a second threshold voltage, a second control unit operating independent from the first control unit and with power supplied from the secondary battery, and a wireless communication unit controlled by the second control unit operating with power supplied from the secondary battery to communicate with a different wireless communication apparatus, wherein, in a case where a detected voltage of the secondary battery is lower than a first threshold voltage that is lower than the second threshold value, the second control unit ends transmission of a packet and communication connection.

9 Claims, 11 Drawing Sheets

(51) Int. Cl.
*H04M 1/73* (2006.01)
*H04M 1/725* (2006.01)
*H04W 4/80* (2018.01)

(52) U.S. Cl.
CPC ...... *H04W 52/0225* (2013.01); *H04M 1/7253* (2013.01); *H04W 4/80* (2018.02); *Y02D 70/142* (2018.01); *Y02D 70/144* (2018.01); *Y02D 70/166* (2018.01)

(56) References Cited

U.S. PATENT DOCUMENTS

| | | | | |
|---|---|---|---|---|
| 2013/0275067 A1* | 10/2013 | Mikuteit | ............... | G06F 17/00 |
| | | | | 702/63 |
| 2014/0050133 A1* | 2/2014 | Jafarian | ............. | H04W 74/085 |
| | | | | 370/311 |
| 2014/0075220 A1* | 3/2014 | Song | ............... | H04W 52/0277 |
| | | | | 713/320 |

\* cited by examiner

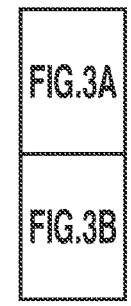
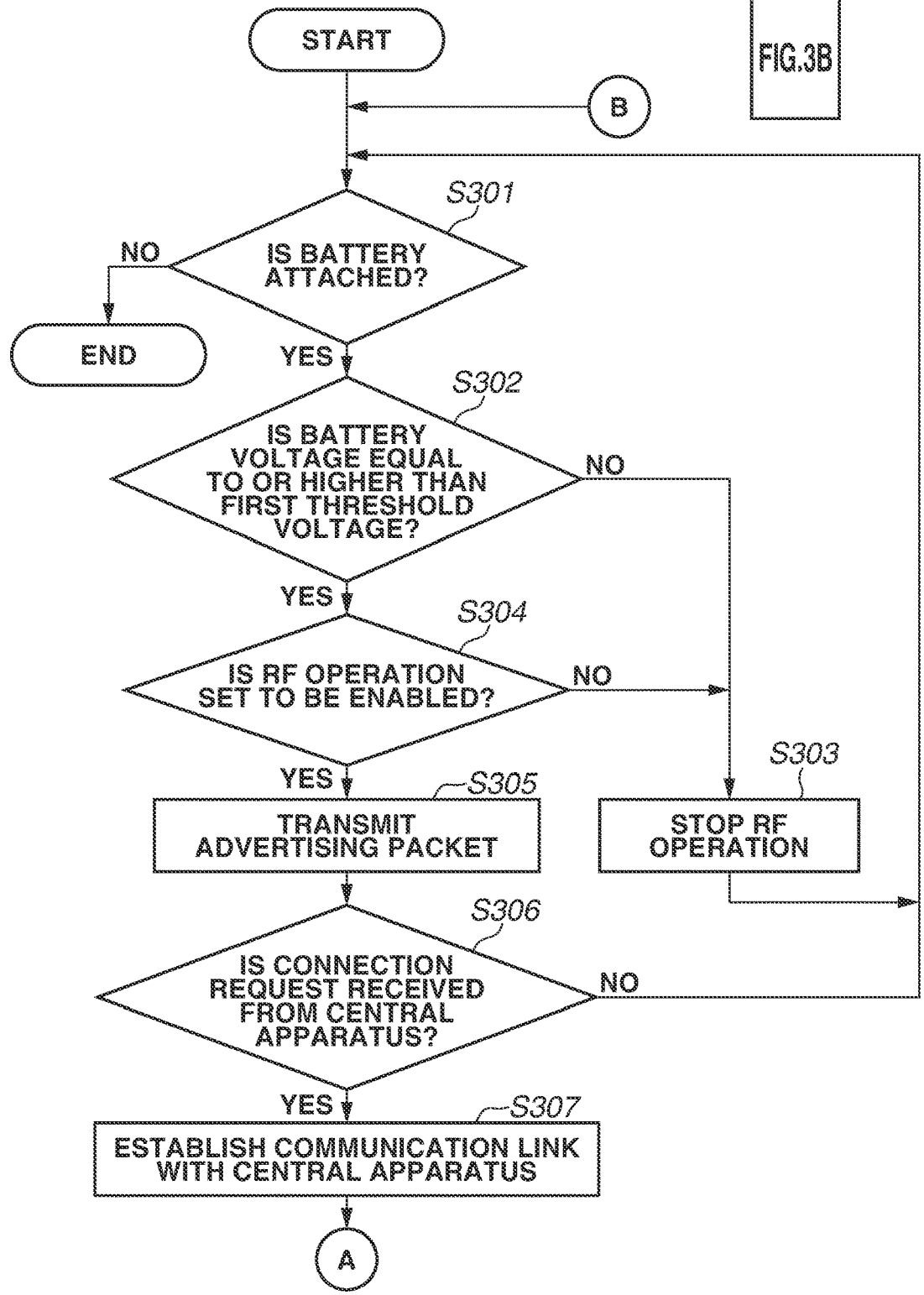

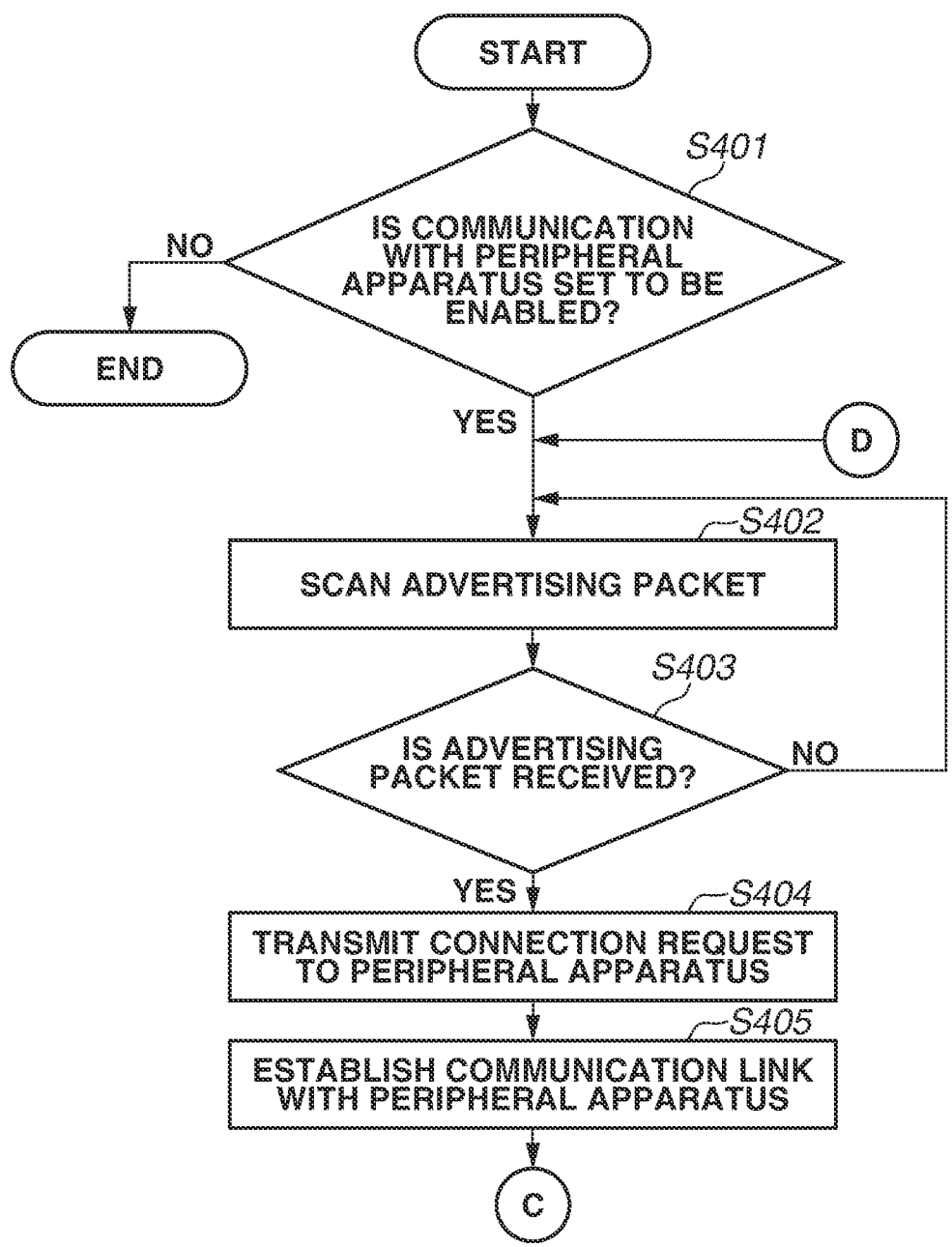

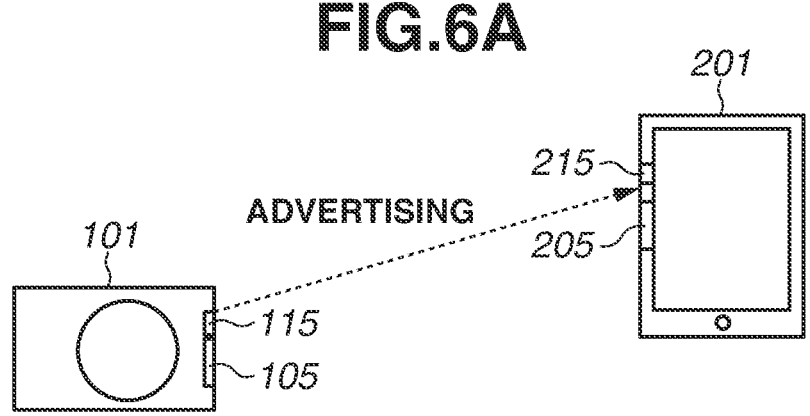
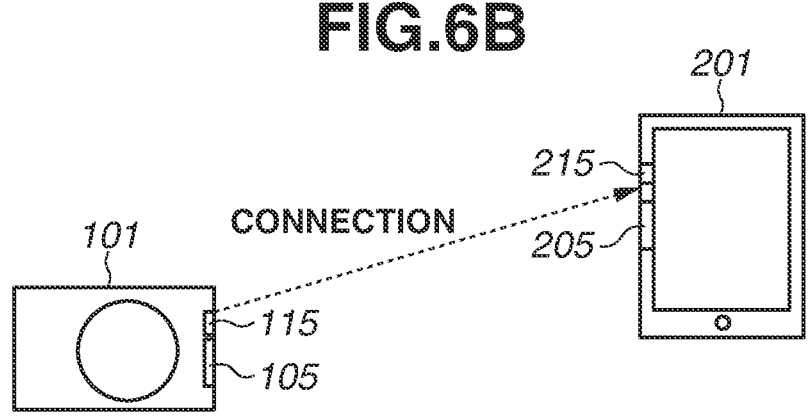
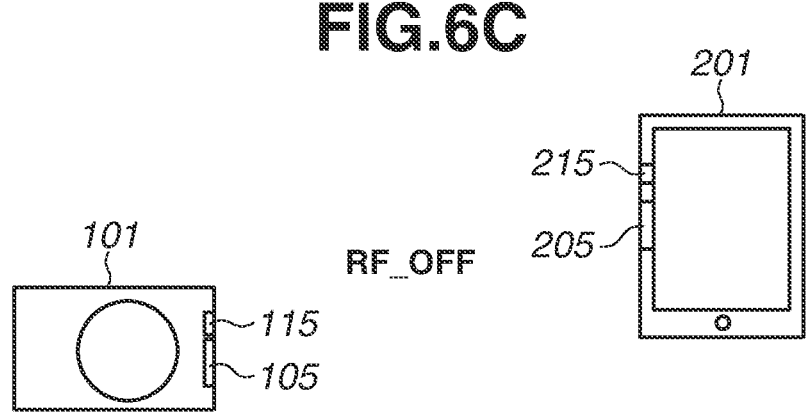

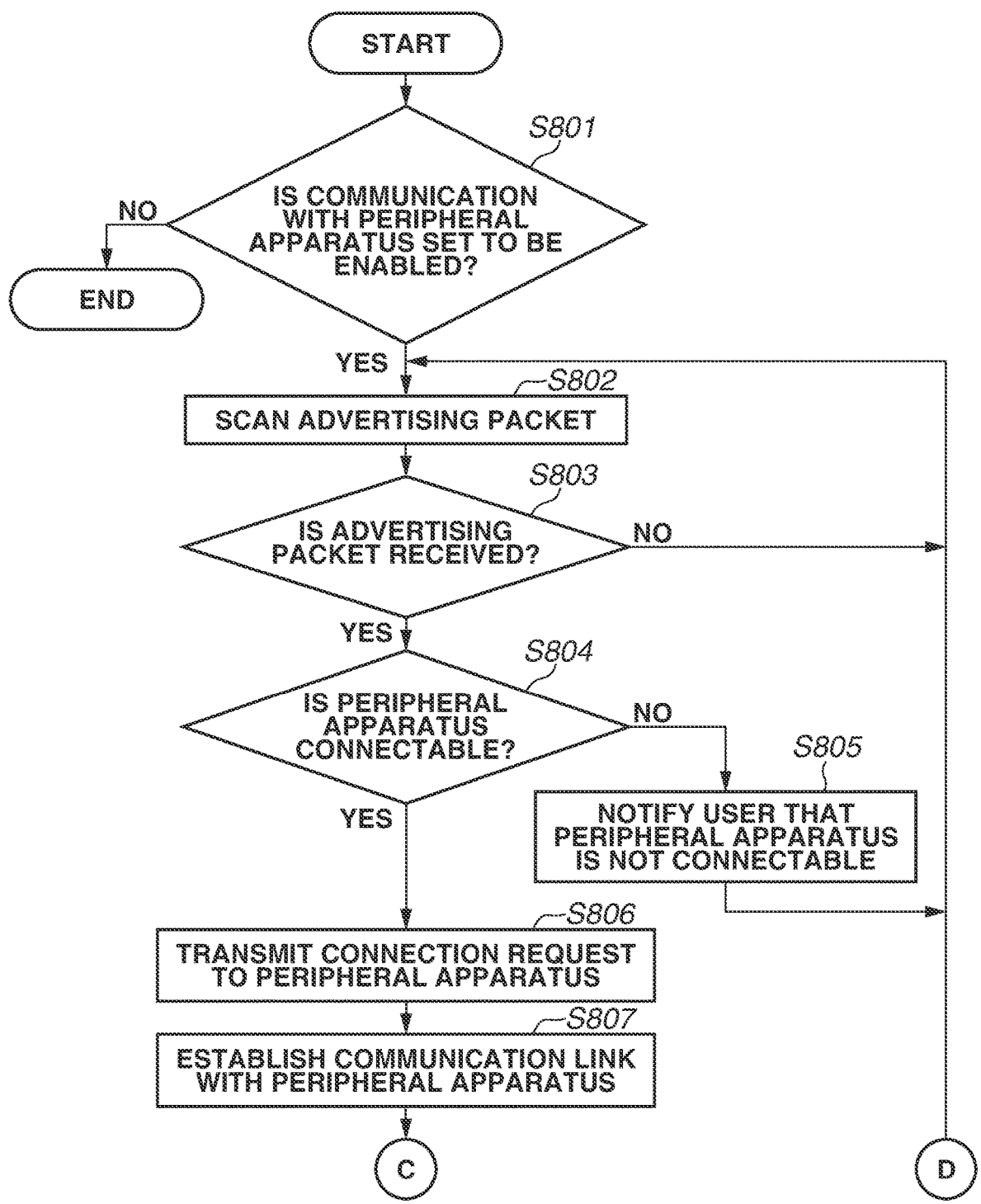

WIRELESS COMMUNICATION APPARATUS WIRELESSLY COMMUNICATING WITH ANOTHER WIRELESS COMMUNICATION APPARATUS, CONTROL METHOD OF WIRELESS COMMUNICATION APPARATUS, AND STORAGE

BACKGROUND

Field

The present disclosure relates to a wireless communication apparatus wirelessly communicating with another wireless communication apparatus, a control method of the wireless communication apparatus, and a storage medium.

Description of the Related Art

Along with popularization of various apparatuses such as information apparatuses (e.g., printing apparatuses), imaging apparatuses (e.g., digital cameras), and accessories thereof provided with a wireless communication function, use of wireless communication connection in data communication or control executed by these apparatuses with a mobile terminal has been rapidly increasing. There is an increase in number of information apparatuses provided with a low-power-consumption wireless communication function represented by a wireless standard such as Bluetooth® Low Energy as a wireless communication function. Generally, a system-on-a-chip (SOC) or a communication module including a low-power-consumption wireless communication function is provided so as to operate independently at low voltage in low power consumption.

As a usage example of the low-power-consumption wireless communication function, there is provided a method in which a functional operation (i.e., service) of a peripheral apparatus (also referred to as "slave apparatus") is started with an instruction from a central apparatus (also referred to as "host apparatus") through communication as a trigger. In the above-described usage, when a battery voltage is not sufficient, there is a case where a service cannot be used because a control unit for executing the service cannot be activated in the peripheral apparatus even though the low-power-consumption wireless communication function is operable. There may also be a case where the battery is brought into the over-discharged state because the low-power-consumption wireless communication function, which is independently operable at low voltage, continuously operates even at the battery voltage at which the control unit of the peripheral apparatus cannot be activated.

To address a method can be provided in which the low-power-consumption wireless communication function is operated only when the control unit of the peripheral apparatus can be activated. However, with this method, because the control unit of the peripheral apparatus is brought into an ON state to monitor the battery voltage, power is consumed by the monitoring operation. In another solution, a method can be provided in which the low-power-consumption wireless communication function is operated only when the battery voltage has a value greater than or equal to a threshold voltage at which the service of the peripheral apparatus can be used with certainty. However, with this method, because of a detection error of the battery voltage, there can be a case where the service cannot be used even though the battery voltage has a value at which the service of the peripheral apparatus is usable. Therefore, it is necessary to employ a method that realizes compatibility between the peripheral apparatus and the low-power-consumption wireless communication function and enables the peripheral apparatus to provide the service as much as possible while suppressing consumption of the battery.

Japanese Patent Application Laid-Open No. 2010-218189 discusses a power supply system of an image forming apparatus that stops power supply with respect to a network interface (I/F) unit when it is determined that the network I/F unit included in the image forming apparatus does not receive a packet from a network. The image forming apparatus discussed in Japanese Patent Application Laid-Open No. 2010-218189 can stop the power supply with respect to the network I/F unit to reduce the power consumption when the packet is not transmitted from the network.

SUMMARY

According to an aspect of the present disclosure, a wireless communication apparatus includes a first control unit configured to operate with power supplied from a secondary battery and to be operable in a case where a detected voltage of the secondary battery is greater than or equal to a second threshold voltage, a second control unit configured to operate independently from the first control unit and to operate with power supplied from the secondary battery, and a wireless communication unit controlled by the second control unit and configured to operate with power supplied from the secondary battery to communicate with a different wireless communication apparatus, wherein, in a case where a detected voltage of the secondary battery is lower than a first threshold voltage that is lower than the second threshold value, the second control unit ends transmission of a packet and communication connection with the different wireless communication apparatus through the wireless communication unit.

Further features will become apparent from the following description of exemplary embodiments with reference to the attached drawings.

BRIEF DESCRIPTION OF THE DRAWINGS

FIGS. 6A, 6B, and 6C are diagrams illustrating arrangement examples of the peripheral apparatus and the central apparatus according to the present exemplary embodiment.

FIG. 8 is a flowchart illustrating another example of operation of the central apparatus according to the present exemplary embodiment.

DESCRIPTION OF THE EMBODIMENTS

Hereinbelow, an exemplary embodiment will be described with reference to the appended drawings. The technical scope of the embodiments is defined by the scope of appended claims, but are not seen to be limiting. Not all of the combinations of features described in the exemplary embodiments are necessary.

Figure 1:
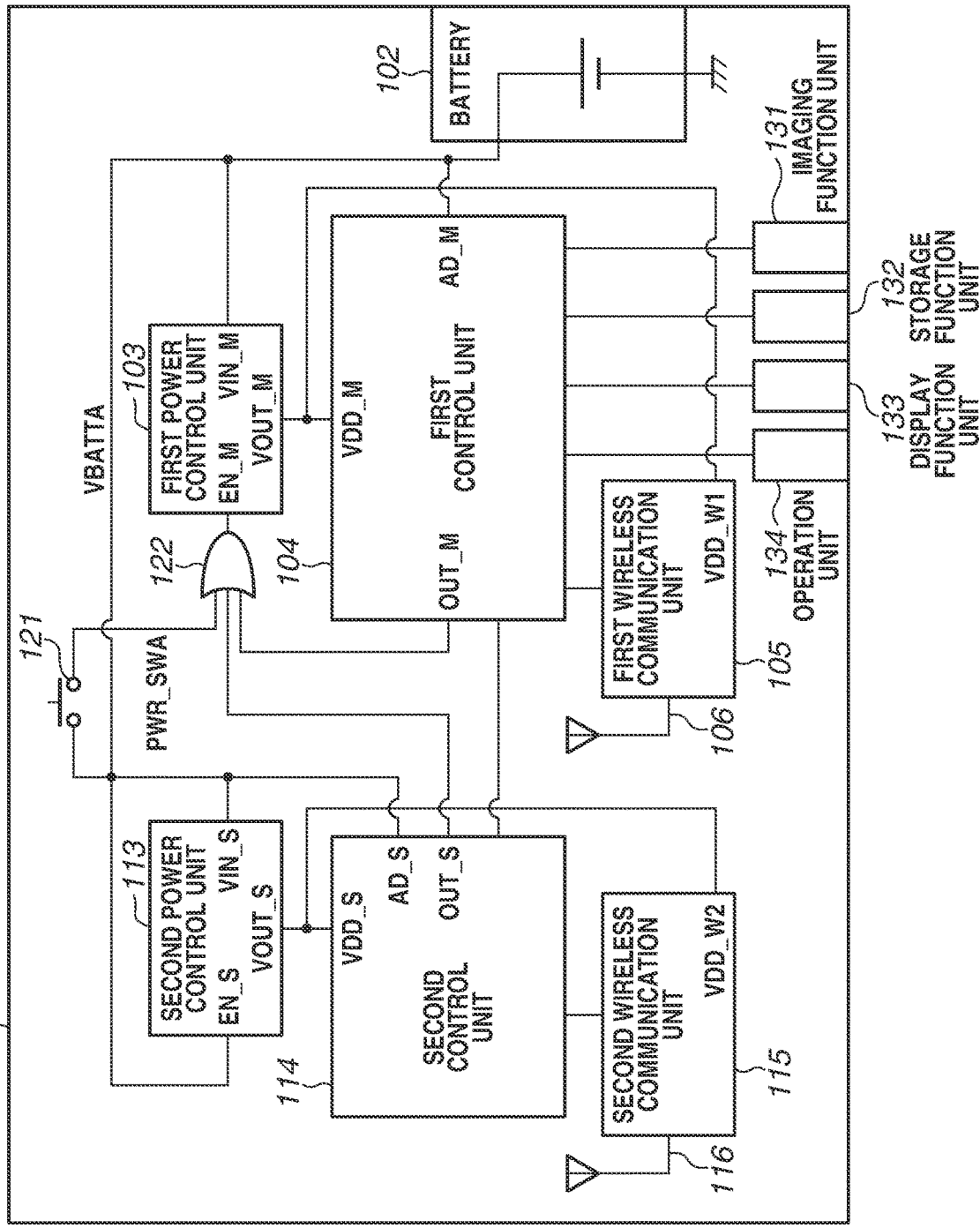
FIG. 1 is a block diagram illustrating an example of a configuration of a peripheral apparatus according to an exemplary embodiment.

First, a configuration of a peripheral apparatus will be described. FIG. 1 is a block diagram illustrating an example of a configuration of a peripheral apparatus 101 according to an exemplary embodiment. The peripheral apparatus 101 can wirelessly communicate with a central apparatus 201 illustrated in FIG. 2. In FIG. 1, power connections with blocks that are not necessary for describing the present exemplary embodiment are omitted. Further, descriptions of blocks or operations that are not necessary for describing the present exemplary embodiment are omitted.

A battery 102 supplies power to the peripheral apparatus 101. For example, the battery 102 is a single-cell lithium-ion secondary battery attachable to and detachable from the peripheral apparatus 101. A name of the signal output from the battery 102 is defined as VBATTA. A first power control unit 103 converts a voltage input VIN_M from the battery 102 into a constant voltage output VOUT_M, and outputs the constant voltage output VOUT_M to a first control unit 104. The first power control unit 103 controls whether to output the constant voltage output VOUT_M according to a control signal EN_M received external from the first power control unit 103.

A second power control unit 113 converts a voltage input VIN_S from the battery 102 into a constant voltage output VOUT_S, and outputs the constant voltage output VOUT_S to a second control unit 114. The second power control unit 113 controls whether to output the constant voltage output VOUT_S according to a control signal EN_S received external from the second power control unit 113. A current that can be supplied from the second power control unit 113 and a self-consumption current thereof are less than those of the first power control unit 103. A voltage of the constant voltage output VOUT_S is lower than that of the constant voltage output VOUT_M. The first power control unit 103 and the second power control unit 113 are, for example, power-supply integrated circuits (ICs).

The first control unit 104 includes a central processing unit (CPU), a random access memory (RAM), and a read only memory (ROM). The CPU executes control processing of the peripheral apparatus 101 including control processing for executing a functional operation (service) according to an instruction from the central apparatus 201. The RAM is used, for example, as a work area, and the ROM stores a processing procedure (i.e., program). The first control unit 104 operates with the constant voltage output VOUT_M of the first power control unit 103 input to a power input VDD_M. The first control unit 104 can detect a voltage of the battery 102 through an analog-digital (AD) input portion AD_M. The first control unit 104 can execute data communication with the second control unit 114.

A first wireless communication unit 105 wirelessly communicates with another apparatus. Wireless communication executed by the first wireless communication unit 105 is compliant with Institute of Electrical and Electronics Engineers (IEEE) 802.11, which is a wireless local area network (WLAN) standard. The first wireless communication unit 105 operates with the constant voltage output VOUT_M of the first power control unit 103 input to a power input VDD_W1. An antenna 106 is an antenna for wirelessly communicating with another apparatus. The antenna 106 has, for example, a resonance frequency close to 2.4 GHz in an ultra-high frequency (UHF) band.

A second control unit 114 includes a CPU, a RAM, and a ROM. The CPU executes control of a part of the peripheral apparatus 101. For example, the RAM is used as a work area, and the ROM stores a processing procedure (i.e., program). The second control unit 114 operates with the constant voltage output VOUT_S of the second power control unit 113 input to a power input VDD_S. The second control unit 114 can detect a voltage of the battery 102 through an AD input portion AD_S. The second control unit 114 can execute data communication with the first control unit 104.

A second wireless communication unit 115 wirelessly communicates with another apparatus. Wireless communication executed by the second wireless communication unit 115 is compliant with Bluetooth® Low Energy, which is a near field wireless communication standard. The second wireless communication unit 115 operates with the constant voltage output VOUT_S of the second power control unit 113 input to a power input VDD_W2. The second wireless communication unit 115 operates with the consumption current lower than that of the first wireless communication unit 105. An antenna 116 is an antenna for wirelessly communicating with another apparatus. The antenna 116 has, for example, a resonance frequency close to 2.4 GHz in the UHF band.

A power switch 121 is a power button switch for bringing the first power control unit 103 of the peripheral apparatus 101 into an ON state (i.e., operation state) to cause the first control unit 104 of the peripheral apparatus 101 to operate. A signal VBATTA and a signal PWR_SWA are conducted to each other when the power switch 121 is pressed. In other words, the signal PWR_SWA is output to another circuit when the power switch 121 is pressed.

The signal PWR_SWA, a signal OUT_M from the first control unit 104, and a signal OUT_S from the second control unit 114 are input to an OR gate 122, and a calculation result is output as a control signal EN_M. Thus, in the present exemplary embodiment, the first power control unit 103 outputs the constant voltage output VOUT_M when any of the signal PWR_SWA, the signal OUT_M from the first control unit 104, or the signal OUT_S from the second control unit 114 is input. The second power control unit 113 outputs the constant voltage output VOUT_S when the signal VBATTA is input from the battery 102.

An imaging function unit 131 is, for example, a function unit including an optical unit configured of a lens and its driving system, an image sensor, and an image processing unit for converting a video image captured by the image sensor into digital data. A storage function unit 132 is, for example, a function unit to which a flash memory card for writing or reading digital data can be attached. A display function unit 133 is, for example, a function unit including a liquid crystal display (LCD) for displaying operation information or video images. An operation unit 134 includes a plurality of button switches, and receives various operations to output operation information to the first control unit 104. The imaging function unit 131, the storage function unit 132, the display function unit 133, and the operation unit 134 operate with the constant voltage output VOUT_M of the first power control unit 103. The imaging function unit 131, the storage function unit 132, the display function unit 133, and the operation unit 134 illustrated in FIG. 1 are only examples, and a function unit of another type can be added.

Figure 2:
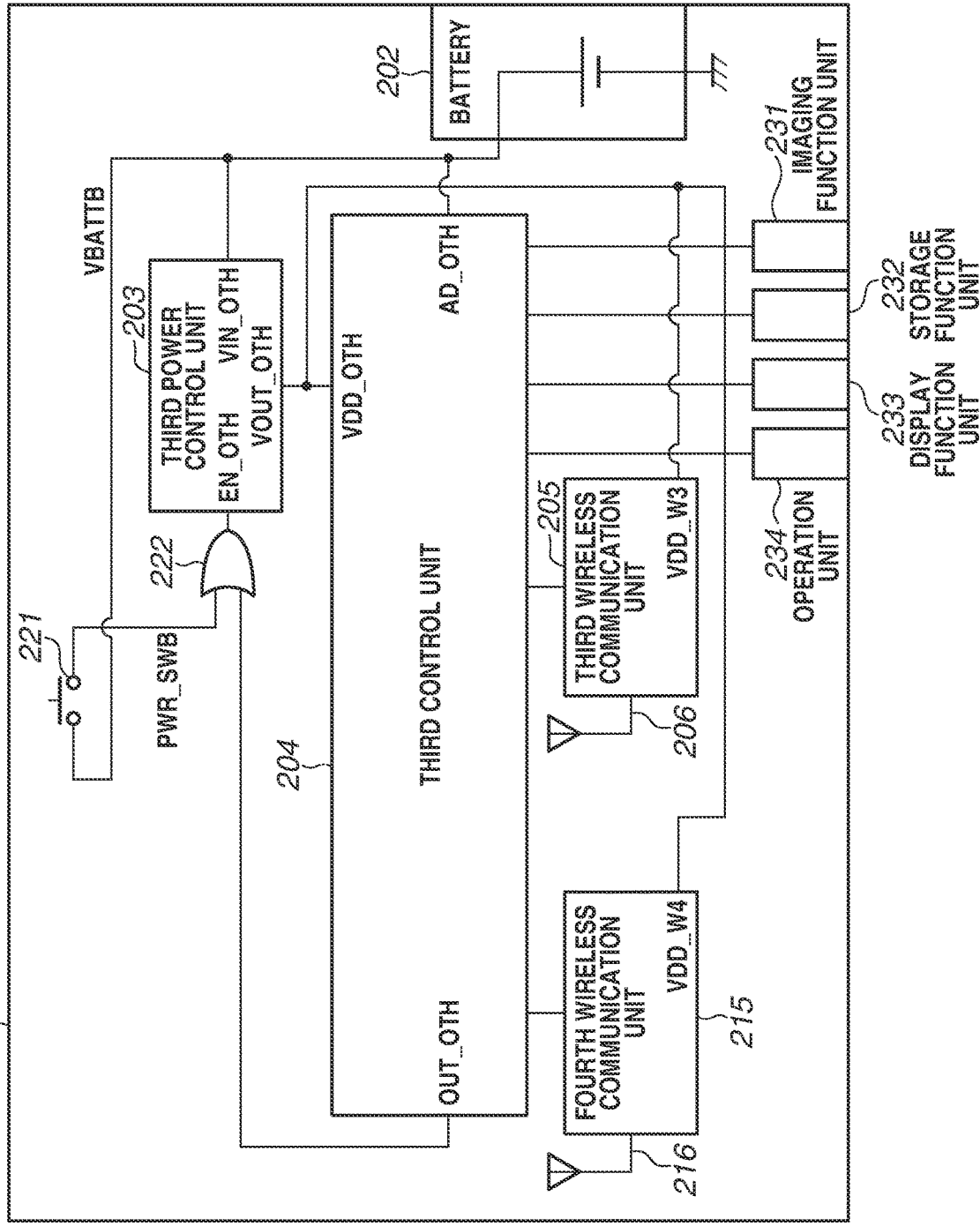
FIG. 2 is a block diagram illustrating an example of a configuration of a central apparatus according to the present exemplary embodiment.

Next, a configuration of a central apparatus will be described. FIG. 2 is a block diagram illustrating an example of a configuration of a central apparatus 201 according to the present exemplary embodiment. The central apparatus 201 can wirelessly communicate with the peripheral apparatus 101 illustrated in FIG. 1. In FIG. 2, power connections with blocks that are not necessary for describing the present exemplary embodiment are omitted. Further, descriptions of blocks and operations that are not necessary for describing the present exemplary embodiment are omitted.

A battery 202 supplies power to the central apparatus 201. The battery 202 is, for example, a single-cell lithium-ion secondary battery that is attachable to and detachable from the central apparatus 201. A name of the signal output from the battery 202 is defined as VBATTB. A third power control unit 203 converts a voltage input VIN_OTH from the battery 202 into a constant voltage output VOUT_OTH, and outputs the constant voltage output VOUT_OTH to a third control unit 204. The third power control unit 203 controls whether to output the constant voltage output VOUT_OTH according to a control signal EN_OTH received external from the third power control unit 203. The third power control unit 203 is, for example, a power-supply IC.

The third control unit 204 includes a CPU, a RAM, and a ROM. The CPU executes control of the central apparatus 201. For example, the RAM is used as a work area, and the ROM stores a processing procedure (i.e., program). The third control unit 204 operates with the constant voltage output VOUT_OTH of the third power control unit 203 input to a power input VDD_OTH. The third control unit 204 can detect a voltage of the battery 202 through an AD input portion AD_OTH.

A third wireless communication unit 205 wirelessly communicates with another apparatus. Wireless communication executed by the third wireless communication unit 205 is compliant with IEEE 802.11, which is a WLAN standard. The third wireless communication unit 205 operates with the constant voltage output VOUT_OTH of the third power control unit 203 input to a power input VDD_W3. An antenna 206 is an antenna for wirelessly communicating with another apparatus. The antenna 206 has, for example, a resonance frequency close to 2.4 GHz in the UHF band.

A fourth wireless communication unit 215 wirelessly communicates with another apparatus. Wireless communication executed by the fourth wireless communication unit 215 is compliant with Bluetooth® Low Energy, which is a near field wireless communication standard. The fourth wireless communication unit 215 operates with the constant voltage output VOUT_OTH of the third power control unit 203 input to a power input VDD_W4. An antenna 216 is an antenna for wirelessly communicating with another apparatus. The antenna 216 has, for example, a resonance frequency close to 2.4 GHz in the UHF band.

A power switch 221 is a power button switch for bringing the third power control unit 203 of the central apparatus 201 into an ON state (i.e., operation state) to cause the third control unit 204 of the central apparatus 201 to operate. A signal VBATTB and a signal PWR_SWB are conducted to each other when the power switch 221 is pressed. In other words, the signal PWR_SWB is output to another circuit when the power switch 221 is pressed.

The signal PWR_SWB and a signal OUT_OTH from the third control unit 204 are input to an OR gate 222, and a calculation result is output as a control signal EN_OTH. In other words, in the present exemplary embodiment, the third power control unit 203 outputs the constant voltage output VOUT_OTH when any of the signal PWR_SWB and the signal OUT_OTH is input from the third control unit 204.

An imaging function unit 231 is, for example, a function unit including an optical unit configured of a lens and its driving system, an image sensor, and an image processing unit for converting a video image captured by the image sensor into digital data. A storage function unit 232 is a function unit to which a flash memory card for writing or reading digital data can be attached. A display function unit 233 is, for example, a function unit including an LCD for displaying operation information or video images. An operation unit 234 includes a plurality of button switches, and receives various operations to output operation information to the third control unit 204. The imaging function unit 231, the storage function unit 232, the display function unit 233, and the operation unit 234 operate with the constant voltage output VOUT_OTH of the third power control unit 203. The imaging function unit 231, the storage function unit 232, the display function unit 233, and the operation unit 234 illustrated in FIG. 2 are only examples, and a function unit of another type can be added.

Figure 3B:
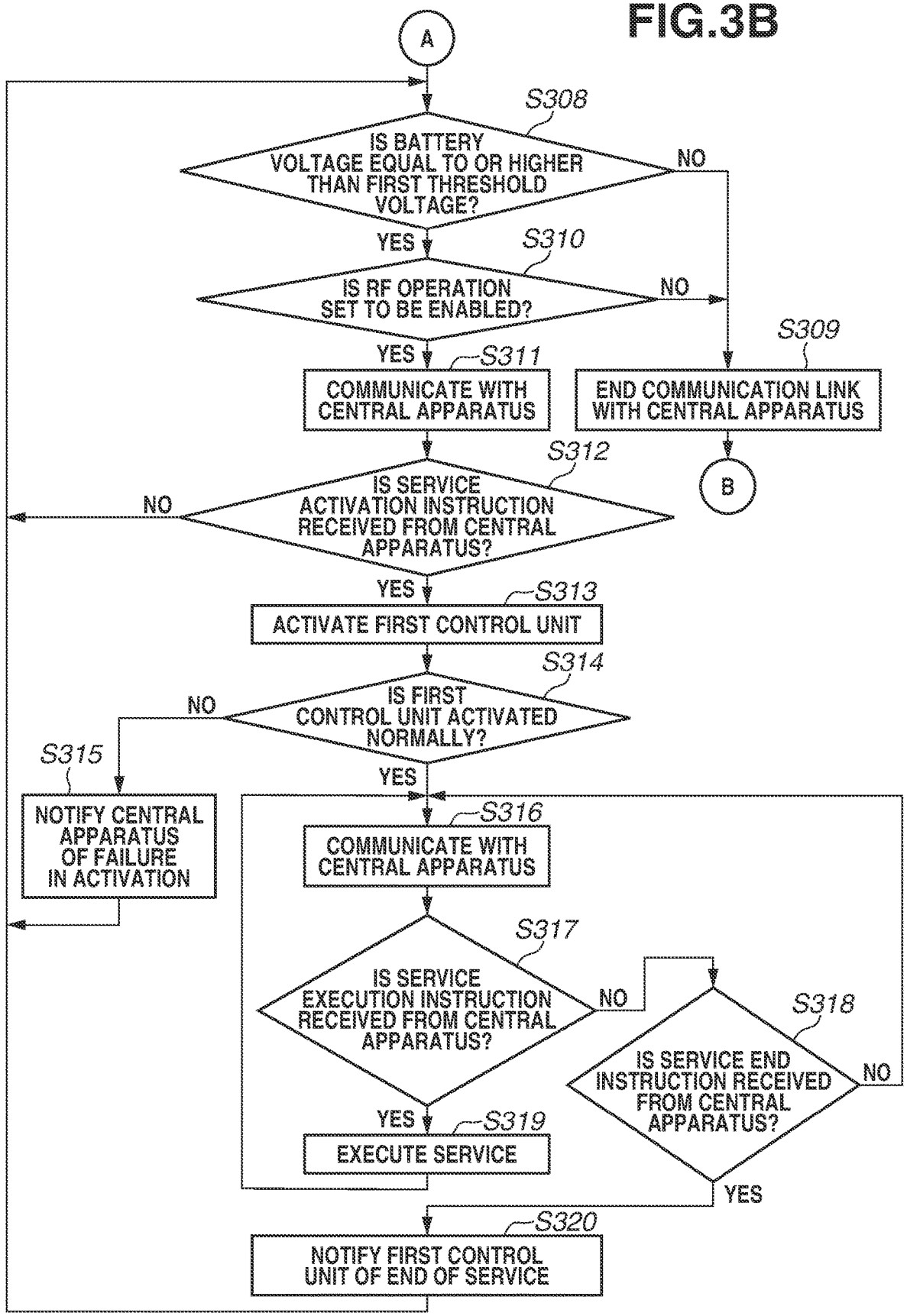
FIG. 3 (consisting of FIGS. 3A and 3B) is a flowchart illustrating an example of operation of the peripheral apparatus according to the present exemplary embodiment.

FIG. 3 (consisting of FIGS. 3A and 3B) is a flowchart illustrating an example of a procedure for communicating with the fourth wireless communication unit 215 of the central apparatus 201 by controlling the second wireless communication unit 115, which is executed by the second control unit 114 of the peripheral apparatus 101 according to the present exemplary embodiment. In step S301, if the second control unit 114 determines that the battery 102 is attached to the peripheral apparatus 101 (YES in step S301), the processing proceeds to step S302. If the battery 102 is not attached thereto (NO in step S301), the processing ends.

In step S302, the second control unit 114 determines whether a voltage of the battery 102 detected through the AD input portion AD_S is greater than or equal to a first threshold voltage. In step S302, if the second control unit 114 determines that the voltage of the battery 102 is lower than the first threshold voltage (NO in step S302), the processing proceeds to step S303. In step S303, the second control unit 114 stops the radiofrequency (RF) operation (i.e., wireless communication operation) of the second wireless communication unit 115, and the processing returns to step S301.

In step S302, if the second control unit 114 determines that the voltage of the battery 102 is greater than or equal to the first threshold voltage (YES in step S302), the processing proceeds to step S304. In step S304, the second control unit 114 determines whether the RF operation of the second wireless communication unit 115 is set to be enabled. Herein, whether the RF operation of the second wireless communication unit 115 is enabled can be set by the operation unit 134 when the first control unit 104 of the peripheral apparatus 101 is operating. The RF operation setting of the second wireless communication unit 115 is stored in the RAM or the ROM of the second control unit 114 through the communication executed by the first control unit 104 and the second control unit 114.

In step S304, if the second control unit 114 determines that the RF operation of the second wireless communication unit 115 is not set to be enabled (NO in step S304), the processing proceeds to step S303. In step S303, the second control unit 114 stops the RF operation of the second wireless communication unit 115, and the processing returns to step S301. If the second wireless communication unit 115 is transmitting an advertising packet when the processing in step S303 is executed, the second control unit 114 stops the transmission of the advertising packet from the second wireless communication unit 115.

In step S304, if the second control unit 114 determines that the RF operation of the second wireless communication unit 115 is set to be enabled (YES in step S304), the processing proceeds to step S305. In step S305, the second control unit 114 controls the second wireless communication unit 115 to transmit the advertising packet. The advertising packet transmitted in step S305 is a data packet that includes a universally unique identifier (UUID) for specifying a function (service) executable by the peripheral apparatus 101. The central apparatus 201 specifies existence of the peripheral apparatus 101 and the service executable thereby through the advertising packet, and can establish a wireless communication link with the peripheral apparatus 101 by transmitting a connection request.

In step S306, the second control unit 114 determines whether the connection request from the central apparatus 201 is received by the second wireless communication unit 115. In step S306, if the second control unit 114 determines that the connection request from the central apparatus 201 is received (YES in step S306), the processing proceeds to step S307. In step S306, if the second control unit 114 determines that the connection request from the central apparatus 201 is not received (NO in step S306), the processing returns to step S301. In step S307, the second control unit 114 controls the second wireless communication unit 115 to establish a communication link with the central apparatus 201, and the processing proceeds to step S308. Herein, establishment of the communication link refers to a state where the second wireless communication unit 115 of the peripheral apparatus 101 and the fourth wireless communication unit 215 of the central apparatus 201 are ready to execute communication at a set time interval (hereinbelow, referred to as "communication interval").

In step S308, the second control unit 114 determines whether a voltage of the battery 102 detected through the AD input portion AD_S is greater than or equal to a first threshold voltage. In step S308, if the second control unit 114 determines that the voltage of the battery 102 is lower than the first threshold voltage (NO in step S308), the processing proceeds to step S309. In step S309, the second control unit 114 controls the second wireless communication unit 115 to transmit a communication link ending notification to the fourth wireless communication unit 215 of the central apparatus 201 and ends the communication link. Then, the second control unit 114 stops the RF operation of the second wireless communication unit 115, and the processing returns to step S301.

In step S308, if the second control unit 114 determines that the voltage of the battery 102 is greater than or equal to the first threshold voltage (YES in step S308), the processing proceeds to step S310. In step S310, the second control unit 114 determines whether the RF operation of the second wireless communication unit 115 is set to be enabled. Determination about the RF operation setting executed in step S310 is similar to the determination described in step S304, so the description thereof is omitted. In step S310, if the second control unit 114 determines that the RF operation of the second wireless communication unit 115 is set to be enabled (YES in step S310), the processing proceeds to step S311. In step S310, if the second control unit 114 determines that the RF operation of the second wireless communication unit 115 is set not to be enabled (NO in step S310), the processing proceeds to step S309. In step S311, the second control unit 114 controls the second wireless communication unit 115 to communicate with the fourth wireless communication unit 215 of the central apparatus 201.

In step S312, the second control unit 114 determines whether a service activation instruction from the central apparatus 201 is received by the second wireless communication unit 115. In step S312, if the second control unit 114 determines that the service activation instruction from the central apparatus 201 is not received by the second wireless communication unit 115 (NO in step S312), the processing returns to step S308.

In step S312, if the second control unit 114 determines that the service activation instruction from the central apparatus 201 is received by the second wireless communication unit 115 (YES in step S312), the processing proceeds to step S313. In step S313, the second control unit 114 outputs the signal OUT_S to bring the first power control unit 103 into the ON state to cause the first control unit 104 to activate. The first control unit 104 activated in step S313 outputs the signal OUT_M to bring the first power control unit 103 into the ON state, and controls the first power control unit 103 to be able to remain in the ON state even if the signal OUT_S is not transmitted from the second control unit 114.

In step S314, the second control unit 114 determines whether the first control unit 104 is activated normally. In step S314, if the second control unit 114 determines that the first control unit 104 is activated normally (YES in step S314), the processing proceeds to step S316. In step S314, if the second control unit 114 determines that the first control unit 104 is activated normally, the second control unit 114 stops outputting the signal OUT_S.

In step S314, if the second control unit 114 determines that the first control unit 104 is not activated normally (NO in step S314), the processing proceeds to step S315. In step S315, the second control unit 114 controls the second wireless communication unit 115 to communicate with the fourth wireless communication unit 215 of the central apparatus 201, notifies the central apparatus 201 of failure in activation of the first control unit 104, and the processing returns to step S308.

In step S314, for example, the second control unit 114 can determine that the first control unit 104 is activated normally when the second control unit 114 can communicate with the first control unit 104 after outputting the signal OUT_S. In other words, if the second control unit 114 cannot communicate with the first control unit 104 after outputting the signal OUT_S for activating the first control unit 104, the second control unit 114 determines that the first control unit 104 is not activated normally. The first control unit 104 cannot be activated normally because of the following cases where the first control unit 104 detects lowering of the voltage of the battery 102 during the activation to stop operation or the first control unit 104 detects some kind of error.

In step S316, the second control unit 114 controls the second wireless communication unit 115 to communicate with the fourth wireless communication unit 215 of the central apparatus 201. The peripheral apparatus 101 also notifies the central apparatus 201 of completion of activation of the first control unit 104 through the communication in step S316. In step S317, the second control unit 114 determines whether a service execution instruction from the central apparatus 201 is received through the communication in step S316.

In step S317, if the second control unit 114 determines that the service execution instruction from the central apparatus 201 is received (YES in step S317), the processing proceeds to step S319. In step S319, the first control unit 104 executes control for executing the service to execute the service, and the processing returns to step S316. The service executed in step S319 is a function that is executed by any of the imaging function unit 131, the storage function unit 132, the display function unit 133, the operation unit 134, or the first wireless communication unit 105 when the first control unit 104 of the peripheral apparatus 101 is operating. Alternatively, the service can be an operation that is to be executed through a combination of the above-described functions.

In step S317, if the second control unit 114 determines that the service execution instruction from the central apparatus 201 is not received (NO in step S317), the processing proceeds to step S318. In step S318, the second control unit 114 determines whether a service end instruction from the central apparatus 201 is received through the communication in step S316.

In step S318, if the second control unit 114 determines that the service end instruction from the central apparatus 201 is received (YES in step S318), the processing proceeds to step S320. In step S320, the second control unit 114 executes communication with the first control unit 104 to notify the first control unit 104 of the end of the service. The first control unit 104 notified of the end of the service stops the output of the signal OUT_M to bring the first power control unit 113 into an OFF state. In step S318, if the second control unit 114 determines that the service end instruction from the central apparatus 201 is not received (NO in step S318), the processing returns to step S316.

Figure 4B:
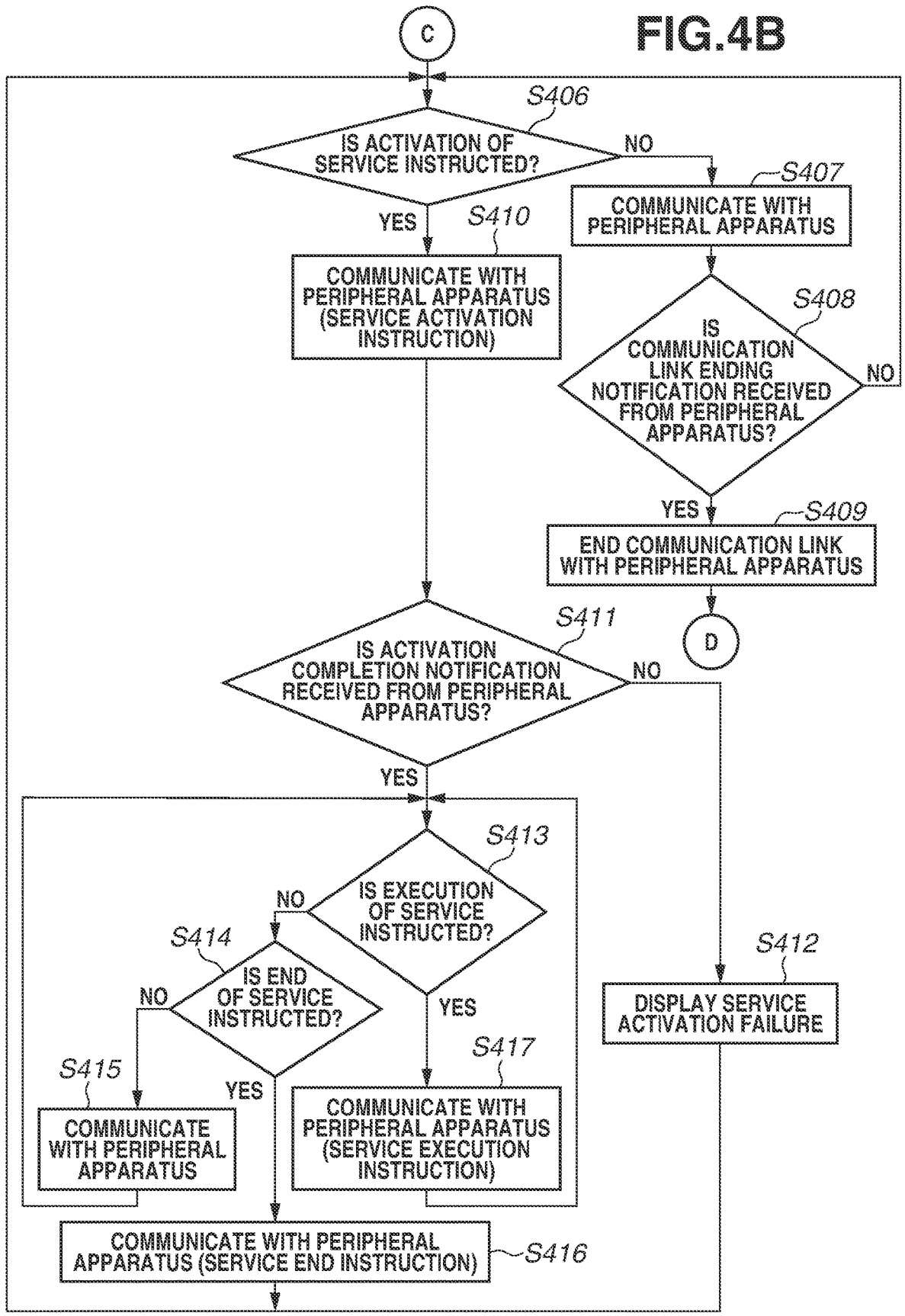
FIG. 4 (consisting of FIGS. 4A and 4B) is a flowchart illustrating an example of operation of the central apparatus according to the present exemplary embodiment.

FIG. 4 (consisting of FIGS. 4A and 4B) is a flowchart illustrating an example of a procedure for communicating with the second wireless communication unit 115 of the peripheral apparatus 101 by controlling the fourth wireless communication unit 215, which is executed by the third control unit 204 of the central apparatus 201 according to the present exemplary embodiment. In step S401, the third control unit 204 determines whether setting for communicating with the second wireless communication unit 115 of the peripheral apparatus 101 through the fourth wireless communication unit 215 is enabled. Herein, whether to enable the communication of the fourth wireless communication unit 215 can be set by the operation unit 234 when the third control unit 204 of the central apparatus 201 is operating. The enabled communication setting of the fourth wireless communication unit 215 is stored in the RAM or the ROM of the third control unit 204.

In step S401, if the third control unit 204 determines that the fourth wireless communication unit 215 is set to be enabled (YES in step S401), the processing proceeds to step S402. If the third control unit 204 determines that the communication of the fourth wireless communication unit 215 is not set to be enabled (NO in step S401), the processing ends. In step S402, the third control unit 204 controls the fourth wireless communication unit 215 to scan the advertising packet. The advertising packet scanned in step S402 is a data packet that includes a UUID for specifying a function (service) executable by the peripheral apparatus 101 via the fourth wireless communication unit 215 of the central apparatus 201. The central apparatus 201 specifies existence of the peripheral apparatus 101 and the service executable thereby through the advertising packet, and establishes a wireless communication link with the peripheral apparatus 101 by transmitting a connection request.

As a result of scanning the advertising packet in step S402, in step S403, the third control unit 204 determines whether the advertising packet from the peripheral apparatus 101 is received. In step S403, if the third control unit 204 determines that the advertising packet from the peripheral apparatus 101 is received (YES in step S403), the processing proceeds to step S404. In step S403, if the third control unit 204 determines that the advertising packet from the peripheral apparatus 101 is not received (NO in step S403), the processing returns to step S402.

In step S404, the third control unit 204 controls the fourth wireless communication unit 215 to transmit a connection request to the peripheral apparatus 101. Then, in step S405, the third control unit 204 controls the fourth wireless communication unit 215 to establish a communication link with the peripheral apparatus 101, and the processing proceeds to step S406. In step S406, the third control unit 204 determines whether activation of the service of the peripheral apparatus 101 is instructed by the operation unit 234. In step S406, if the third control unit 204 determines that activation of the service of the peripheral apparatus 101 is instructed (YES in step S406), the processing proceeds to step S410.

In step S406, if the third control unit 204 determines that activation of the service of the peripheral apparatus 101 is not instructed (NO in step S406), the processing proceeds to step S407. In step S407, the third control unit 204 controls the fourth wireless communication unit 215 to communicate with the second wireless communication unit 115 of the peripheral apparatus 101. In step S408, the third control unit 204 determines whether a communication link ending notification from the peripheral apparatus 101 is received through the communication in step S407. In step S408, if the third control unit 204 determines that the communication link ending notification from the peripheral apparatus 101 is received (YES in step S408), the processing proceeds to step S409. In step S409, the third control unit 204 controls the fourth wireless communication unit 215 to end the communication link, and the processing returns to step S402. In step S408, if the third control unit 204 determines that the communication link ending notification from the peripheral apparatus 101 is not received (NO in step S408), the processing returns to step S406.

In step S410, the third control unit 204 controls the fourth wireless communication unit 215 to communicate with the second wireless communication unit 115 of the peripheral apparatus 101. Through the communication in step S410, the third control unit 204 transmits the service activation instruction to the peripheral apparatus 101 and receives a notification from the peripheral apparatus 101 that indicates a result with respect to the service activation instruction. In step S411, the third control unit 204 determines whether an activation completion notification from the first control unit 104 of the peripheral apparatus 101 is received through the communication in step S410.

In step S411, if the third control unit 204 determines that the activation completion notification from the first control unit 104 is received (YES in step S411), the processing proceeds to step S413. If the third control unit 204 determines that the activation completion notification from the first control unit 104 is not received (NO in step S411), the processing proceeds to step S412. In step S412, the third control unit 204 controls the display function unit 233 to display a message indicating a failure in activation of the service of the peripheral apparatus 101, and the processing returns to step S406.

In step S413, the third control unit 204 determines whether execution of the service of the peripheral apparatus 101 is instructed by the operation unit 234. In step S413, if the third control unit 204 determines that execution of the service of the peripheral apparatus 101 is instructed (YES in step S413), the processing proceeds to step S417. In step S417, the third control unit 204 controls the fourth wireless communication unit 215 to communicate with the second wireless communication unit 115 of the peripheral apparatus 101, and the processing returns to step S413. Through the communication in step S417, the third control unit 204 transmits the service execution instruction to the peripheral apparatus 101.

In step S413, if the third control unit 204 determines that execution of the service of the peripheral apparatus 101 is not instructed (NO in step S413), the processing proceeds to step S414. In step S414, the third control unit 204 determines whether ending of the service of the peripheral apparatus 101 is instructed by the operation unit 234. In step S414, if the third control unit 204 determines that ending of the service of the peripheral apparatus 101 is instructed (YES in step S414), the processing proceeds to step S416. In step S416, the third control unit 204 controls the fourth wireless communication unit 215 to communicate with the second wireless communication unit 115 of the peripheral apparatus 101, and the processing returns to step S406. Through the communication in step S416, the third control unit 204 transmits the service end instruction to the peripheral apparatus 101.

In step S414, if the third control unit 204 determines that ending of the service of the peripheral apparatus 101 is not instructed (NO in step S414), the processing proceeds to step S415. In step S415, the third control unit 204 controls the fourth wireless communication unit 215 to communicate with the second wireless communication unit 115 of the peripheral apparatus 101, and the processing returns to step S413.

Figure 5A:
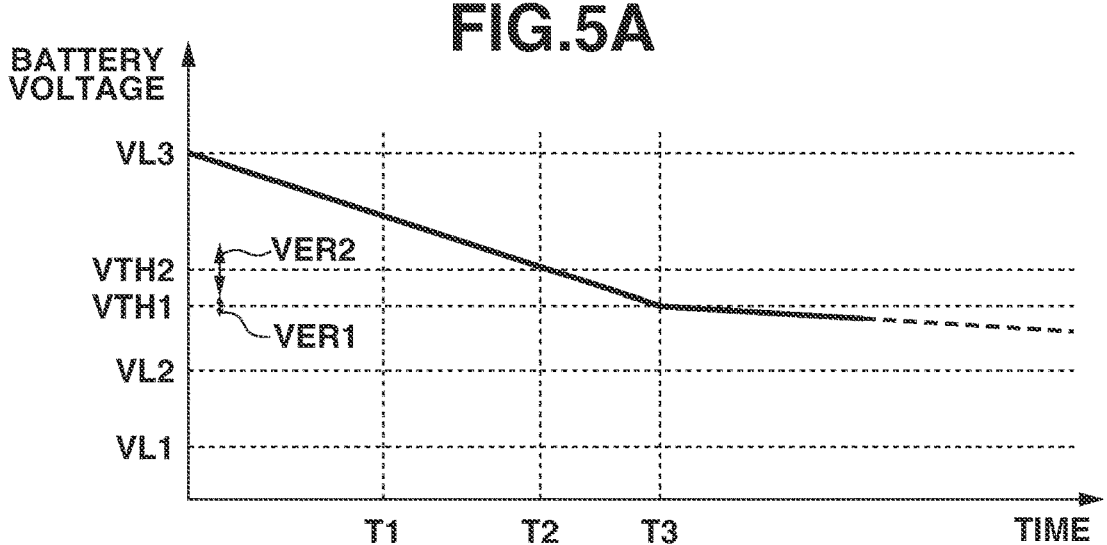
FIGS. 5A, 5B, and 5C are graphs illustrating examples of a relationship between a battery voltage, a threshold voltage, and an operation state of a second wireless communication unit of the peripheral apparatus according to the present exemplary embodiment.
Figure 5B:
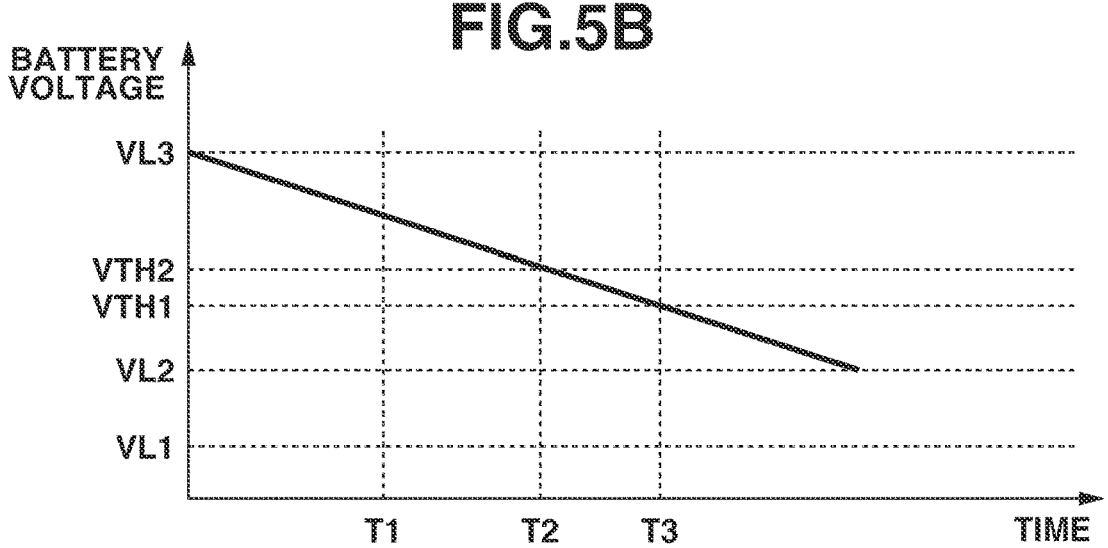
Figure 5C:
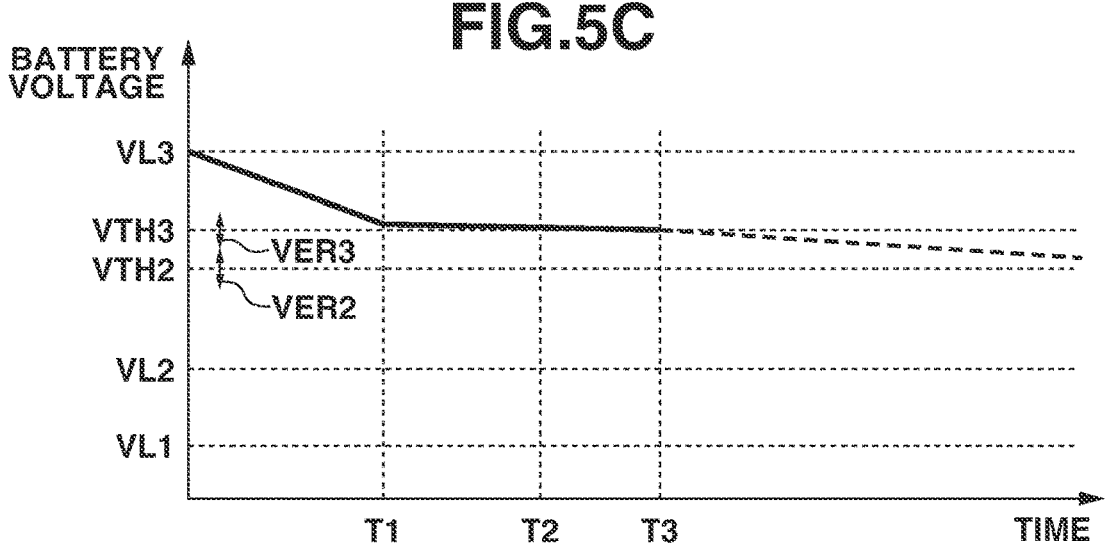

FIGS. 5A, 5B, and 5C are graphs each illustrating a relationship between the voltage and threshold voltages of the battery 102, and an operation state of the second wireless communication unit 115 of the peripheral apparatus 101 according to the present exemplary embodiment. In FIGS. 5A, 5B, and 5C, "VL1" represents an activatable voltage of the second control unit 114, and "VL2" and "VL3" respectively represent a termination voltage and a full-charge voltage of the battery 102. Further, "VTH1", "VTH2", and "VTH3" respectively represent a first, a second, and a third threshold voltages. FIG. 5A is a graph schematically illustrating a state where the peripheral apparatus 101 starts the RF operation of the second wireless communication unit 115 in accordance with the flowchart illustrated in FIG. 3 from a state where the voltage of the battery 102 is in a full-charge state, so that the voltage of the battery 102 is lowered as time passes. In addition, the RF operation of the second wireless communication unit 115 refers to transmission of the advertising packet and communication with the central apparatus 201.

The first threshold voltage VTH1 of the voltage of the battery 102 is a voltage at which the second control unit 114 and the second wireless communication unit 115 can operate. Determination about the first threshold voltage VTH1 of the voltage of the battery 102 is executed by detecting the voltage of the battery 102 through the AD input portion AD_S of the second control unit 114 when the second control unit 114 is operating. In consideration of fluctuations in the voltage of the battery 102 during operation of the second control unit 114 and an error caused by a circuit structure of the AD input portion AD_S, the first threshold voltage VTH1 contains a first threshold voltage detection error range VER1. It is desirable for the first threshold voltage VTH1 to have hysteresis characteristics, so that the RF operation of the second wireless communication unit 115 is prevented from starting and stopping the RF operations repeatedly when the voltage of the battery 102 fluctuates in a vicinity of the first threshold voltage VTH1. For example, the first threshold voltage VTH1 can be set to be higher by a predetermined value when the RF operation of the second wireless communication unit 115 is stopped, and can be set to be lower by a predetermined value when the RF operation of the second wireless communication unit 115 is being executed.

The second threshold voltage VTH2 of the voltage of the battery 102 is a voltage at which the first control unit 104 can be activated to execute the service. Determination about the second threshold voltage of the voltage of the battery 102 is executed by detecting the voltage of the battery 102 through the AD input portion AD_M of the first control unit 104 when the first control unit 104 is operating. In consideration of fluctuations in the voltage of the battery 102 during operation of the first control unit 104 and an error caused by a circuit structure of the AD input portion AD_M, the second threshold voltage VTH2 contains a second threshold voltage detection error range VER2.

The second threshold voltage detection error range VER2 is greater than the first threshold voltage detection error range VER1. This is because the consumption current at the first control unit 104 and the functional unit controlled by the first control unit 104 is greater than the consumption current at the second control unit 114 and the functional unit controlled by the second control unit 114.

In FIG. 5A, the first threshold voltage VTH1 is a value higher than the termination voltage VL2 of the battery 102 and the activatable voltage VL1 of the second control unit 114, but lower than the second threshold voltage VTH2. Then, the first threshold voltage detection error range VER1 of the first threshold voltage VTH1 and the second threshold voltage detection error range VER2 of the second threshold voltage VTH2 are set without overlapping. Herein, the termination voltage VL2 of the battery 102 is a start-up voltage of a protection circuit, which is included in the battery 102 in order to prevent the lithium-ion secondary battery from being completely discharged.

In FIG. 5A, when the peripheral apparatus 101 starts the operation according to the flowchart illustrated in FIG. 3, the voltage of the battery 102 reaches the second threshold voltage VTH2 at time T2. Thereafter, the voltage of the battery 102 reaches the first threshold voltage VTH1 at time T3, so that the RF operation of the second wireless communication unit 115 is stopped. Then, after the time T3, the voltage of the battery 102 is gradually lowered because the RF operation of the second wireless communication unit 115 is stopped, so that consumption of the battery 102 is reduced.

FIGS. 6A, 6B, and 6C are diagrams illustrating arrangement examples of the peripheral apparatus 101 and the central apparatus 201 according to the present exemplary embodiment. FIGS. 6A, 6B, and 6C will be described according to the operation described in FIG. 5A. Until the time T3 illustrated in FIG. 5A, because the peripheral apparatus 101 executes the RF operation of the second wireless communication unit 115, the peripheral apparatus 101 is in an advertising state illustrated in FIG. 6A or a connection state illustrated in FIG. 6B. The advertising state illustrated in FIG. 6A is a state where the peripheral apparatus 101 is transmitting the advertising packet from the second wireless communication unit 115. The connection state illustrated in FIG. 6B is a state where a wireless communication link is established between the second wireless communication unit 115 of the peripheral apparatus 101 and the fourth wireless communication unit 215 of the central apparatus 201.

After the time T3 illustrated in FIG. 5A, 5B, or 5C, because the peripheral apparatus 101 stops the RF operation of the second wireless communication unit 115, the peripheral apparatus 101 is in an RF_OFF state illustrated in FIG. 6C. The RF_OFF state illustrated in FIG. 6C is a state where the second wireless communication unit 115 of the peripheral apparatus 101 does not transmit the advertising packet, and the wireless communication link is not established with the fourth wireless communication unit 215 of the central apparatus 201.

In order to compare a state of lowering the voltage with that of the present exemplary embodiment, a state of lowering the voltage of the battery 102 when the peripheral apparatus 101 does not stop the RF operation of the second wireless communication unit 115 at the first threshold voltage VTH1 is schematically illustrated in FIG. 5B. In FIG. 5B, the voltage of the battery 102 reaches the second threshold voltage VTH2 at time T2, and reaches the first threshold voltage VTH1 at time T3. After that, because the RF operation of the second wireless communication unit 115 is executed continuously without being stopped, the operation is stopped when the voltage of the battery 102 reaches the termination voltage VL2. Because consumption of the battery 102 is large in the operation illustrated in FIG. 5B, it will take a long time to charge the battery 102 and make the peripheral apparatus 101 usable. Therefore, the operation illustrated in FIG. 5A to which the present exemplary embodiment is applied is more advantageous.

In order to compare a state of lowering the voltage with the state of the present exemplary embodiment, a state of lowering the voltage of the battery 102 when the peripheral apparatus 101 stops the RF operation of the second wireless communication unit 115 at an optional threshold voltage set to be higher than the second threshold voltage VTH2 is schematically illustrated in FIG. 5C. In FIG. 5C, the optional threshold voltage is illustrated as a threshold voltage VTH3. In FIG. 5C, the voltage of the battery 102 reaches the third threshold voltage VTH3 at time T1, so that the RF operation of the second wireless communication unit 115 is stopped. Then, after the time T1, the RF operation of the second wireless communication unit 115 is stopped, so that the voltage of the battery 102 is gradually lowered. Because the RF operation of the second wireless communication unit 115 is stopped at time T1 in the operation illustrated in FIG. 5C, a period of time in which the service can be executed through the second wireless communication unit 115 is shortened by an amount of time T2−T1 compared to the case of the operation illustrated in FIG. 5A. Therefore, the operation illustrated in FIG. 5A to which the present exemplary embodiment is applied is more advantageous.

According to the present exemplary embodiment, in the peripheral apparatus 101, the operation of the second wireless communication unit 115, which is operably independent from the first control unit 104, is controlled by the second control unit 114, which is operably independent from the first control unit 104. With this configuration, a time period for providing the service of the peripheral apparatus 101 executed via the second wireless communication unit 115 can be increased, so that the service can be executed appropriately while consumption of the battery 102 can be suppressed.

In the above-described exemplary embodiment, a description has been provided of the exemplary embodiment in which the second wireless communication unit 115 of the peripheral apparatus 101 and the fourth wireless communication unit 215 of the central apparatus 201 execute communication compliant with the Bluetooth® Low Energy of the near field wireless communication standard. However, the wireless communication is not limited to Bluetooth® Low Energy. Other communication standards, for example, IEEE 802.15.1 or IEEE 802.15.4, are also applicable. In other words, other communication standards that lower the power consumption are applicable.

In the above-described exemplary embodiment, a description has been provided of the exemplary embodiment in which an antenna having the resonance frequency close to 2.4 GHz in the UHF band is used as the antenna 116 of the peripheral apparatus 101 or the antenna 216 of the central apparatus 201. However, the antenna is not limited to an antenna having the resonance frequency close to 2.4 GHz in the UHF band. An antenna having an optional resonance frequency can be used as long as communication can be executed between the second wireless communication unit 115 of the peripheral apparatus 101 and the fourth wireless communication unit 215 of the central apparatus 201.

In the above-described exemplary embodiment, a description has been provided of the method of establishing a communication link in which the peripheral apparatus 101 transmits the advertising packet whereas the central apparatus 201 scans the advertising packet to transmit a connection request to the peripheral apparatus 101. However, the method of establishing the communication link and roles of respective units are not limited to those described above. Roles of the wireless communication units and a sequence for establishing the communication link different from those described above can be employed as long as the communication link is established by executing the connection request by the peripheral apparatus 101 and the central apparatus 201.

In the above-described exemplary embodiment, the operation is started to cause the battery 102 to be discharged to lower the voltage thereof from a fully-charged state. However, the operation is not limited to the operation in which the battery 102 is discharged to lower the voltage. For example, if the peripheral apparatus 101 includes a function for charging the battery 102, the battery 102 is charged, so that the voltage is increased. In such a case, the RF operation can be returned from a stopped state to an operable state through determination processing of the threshold voltage of the battery voltage in steps S302 and S308 by applying the flowchart illustrated in FIG. 3.

Figure 7:
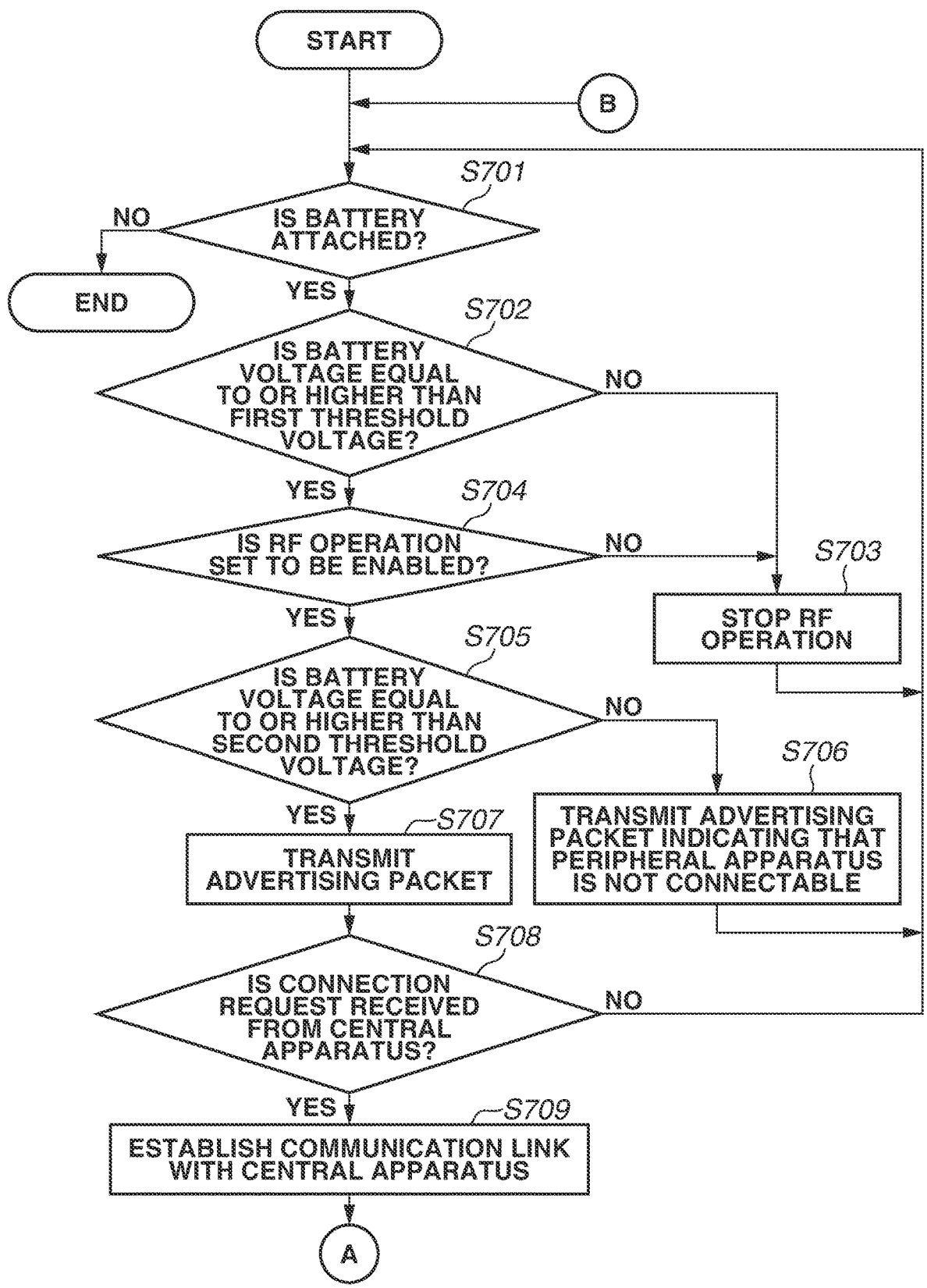
FIG. 7 is a flowchart illustrating another example of operation of the peripheral apparatus according to the present exemplary embodiment.

In the above-described exemplary embodiment, the advertising packet is transmitted when the second control unit 114 determines that the battery voltage is greater than or equal to the first threshold voltage through determination of the threshold voltage of the battery voltage in step S302 and determines that the RF operation is enabled through the determination of the RF operation in step S304. As illustrated in FIG. 7, in step S705, the second control unit 114 can check whether the battery voltage is greater than or equal to the second threshold voltage at which the first control unit 104 cannot be activated. If the second control unit 114 determines that the battery voltage is greater than or equal to the second threshold voltage (YES in step S705), the processing proceeds to step S707. If the second control unit 114 determines that the battery voltage is lower than the second threshold voltage (NO in step S705), the processing proceeds to step S706. In step S706, the second control unit 114 can control the second wireless communication unit 115 to transmit the advertising packet indicating that the peripheral apparatus 101 is not connectable. In FIG. 7, the processing in steps S701 to S704 is similar to the processing in steps S301 to S304 in FIG. 3, and the processing in steps S707 to S709 is similar to the processing in steps S305 to S307 in FIG. 3.

In the above-described exemplary embodiment, a connection request is transmitted to the peripheral apparatus 101 when the third control unit 204 of the central apparatus 201 determines that the advertising packet is received in step S403. However, even though the connection request is transmitted thereto, the first control unit 104 cannot be activated if the battery voltage is lower than the second threshold voltage. Therefore, as illustrated in FIG. 8, in step S804, the third control unit 204 can check whether the peripheral apparatus 101 is connectable by checking the received advertising packet. If the third control unit 204 determines that the peripheral apparatus 101 is connectable (YES in step S804), the processing proceeds to step S806. If the third control unit 204 determines that the peripheral apparatus 101 is not connectable (NO in step S804), the processing proceeds to step S805. In step S805, the third control unit 204 can notify the user that the peripheral apparatus 101 is not connectable through the display function unit 233. In FIG. 8, the processing in steps S801 to S803 is similar to the processing in steps S401 to S403 in FIG. 4, and the processing in steps S806 and S807 is similar to the processing in steps S404 and S405 in FIG. 4.

Figure 9A:
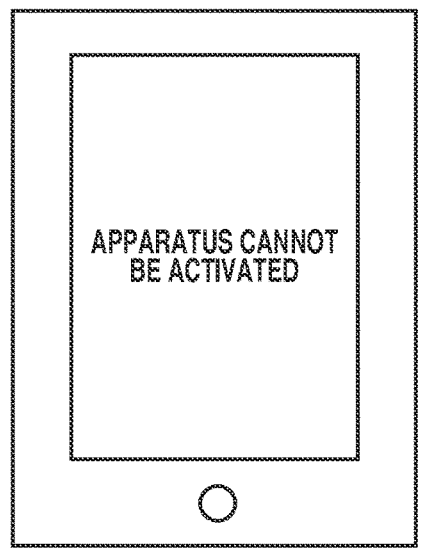
FIGS. 9A, 9B, and 9C are diagrams illustrating examples of display screens for notifying that the peripheral apparatus is not connectable.
Figure 9B:
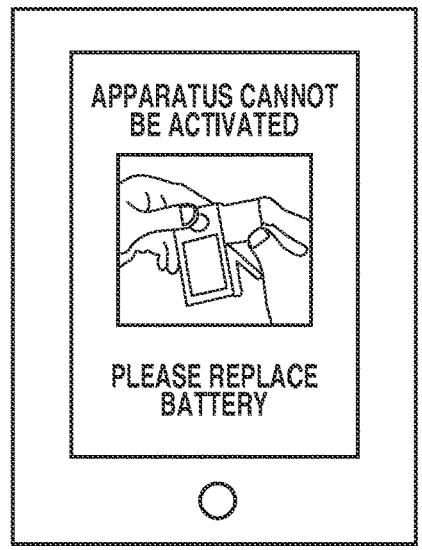
Figure 9C:
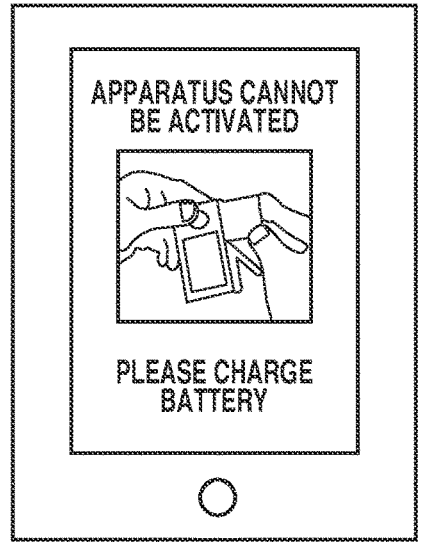

Screens illustrated in FIGS. 9A to 9C can, for example, be displayed when the central apparatus 201 notifies the user that the peripheral apparatus 101 is not connectable. FIG. 9A is an example of a screen on which only characters for notifying the user that the apparatus cannot be activated is displayed. FIGS. 9B and 9C are examples of screens on which an activation method is displayed together with characters for notifying the user that the apparatus cannot be activated. The display content is not limited to the above examples, and can be changed as appropriate.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-086427, filed Apr. 22, 2016, which is hereby incorporated by reference herein in its entirety.

What is claimed is:

1. A wireless communication apparatus comprising:
a first processor that operates with power supplied from a secondary battery, is operable in a case where a detected voltage of the secondary battery is greater than or equal to a second threshold voltage and is not operable in a case where the voltage of the secondary battery is less than the second threshold voltage;
a second processor that operates independently from the first processor, operates with power supplied from the secondary battery and is operable in the case where the voltage of the secondary battery is less than the second threshold voltage; and
a wireless communication interface that is controlled by the second processor, operates with power supplied from the secondary battery to communicate with a different wireless communication apparatus and is operable in the case where the voltage of the secondary battery is less than the second threshold voltage,
wherein, in a case where a detected voltage of the secondary battery is lower than a first threshold voltage that is lower than the second threshold voltage, the second processor ends transmission of a packet and communication connection with the different wireless communication apparatus through the wireless communication interface, and
wherein, in a case where a detected voltage of the secondary battery is more than or equal to the first threshold voltage and is lower than the second threshold voltage, the second processor controls the wireless communication interface to broadcast packets including information indicating that the first processor is not operable so that the communication apparatus informs the different wireless communication apparatus, without establishing connection with the different wireless communication apparatus, that the first processor is not operable.

2. The wireless communication apparatus according to claim 1, wherein, in a case where a detected voltage of the secondary battery is greater than or equal to the first threshold voltage, the second processor controls the wireless communication interface so as to be able to transmit a packet and communicate with the different wireless communication apparatus.

3. The wireless communication apparatus according to claim 1, wherein, in a case where a detected voltage of the secondary battery is lower than the second threshold voltage, the first processor stops power supplied from the secondary battery to the first processor.

4. The wireless communication apparatus according to claim 1, wherein, in a case where an activation instruction of a function executed by the first processor is received from the different wireless communication apparatus via the wireless communication interface, the second processor starts supplying power from the secondary battery to the first processor to activate the first processor.

5. The wireless communication apparatus according to claim 4, wherein, in a case where the first processor is not activated, the second processor notifies the different wireless communication apparatus that the first processor is not activated.

6. The wireless communication apparatus according to claim 4, wherein, in a case where an end instruction of a function executed by the first processor is received from the different wireless communication apparatus via the wireless communication interface, the second processor stops supplying power from the secondary battery to the first processor.

7. The wireless communication apparatus according to claim 1, wherein the packet includes information that specifies a function executable by the first processor.

8. The wireless communication apparatus according to claim 1, wherein the first threshold voltage has hysteresis characteristics.

9. A non-transitory computer-readable storage medium storing computer executable instructions for implementing a control method of a wireless communication apparatus including a first processor that operates with power supplied from a secondary battery, is operable in a case where a detected voltage of the secondary battery is greater than or equal to a second threshold voltage and is not operable in a case where the voltage of the secondary battery is less than the second threshold voltage, a second processor that operates independently from the first processor, operates with power supplied from the secondary battery and is operable in the case where the voltage of the secondary battery is less than the second threshold voltage, and a wireless communication interface that is controlled by the second processor, operates with power supplied from the secondary battery to communicate with a different wireless communication apparatus and is operable in the case where the voltage of the secondary battery is less than the second threshold voltage, the control method comprising:

detecting a voltage of the secondary battery;
 ending transmission of a packet and communication connection with the different wireless communication apparatus through the wireless communication interface in a case where the detected voltage of the secondary battery is lower than a first threshold voltage that is lower than the second threshold voltage, and
 in a case where a detected voltage of the secondary battery is more than or equal to the first threshold voltage and is lower than the second threshold voltage, controlling the wireless communication interface to broadcast packets including information indicating that the first processor is not operable so that the communication apparatus informs the different wireless communication apparatus, without establishing connection with the different wireless communication apparatus, that the first processor is not operable.

* * * * *